United States Patent [19]
Griffin, Jr.

[11] Patent Number: 5,461,854
[45] Date of Patent: Oct. 31, 1995

[54] COMBUSTOR COOLING FOR GAS TURBINE ENGINES

[76] Inventor: Arthur T. Griffin, Jr., 1320 Cadillac Blvd., #103, Detroit, Mich. 48214

[21] Appl. No.: 87,974

[22] Filed: Jul. 7, 1993

[51] Int. Cl.$^6$ .................................................. F02G 3/00
[52] U.S. Cl. ..................... 60/39.05; 60/39.53; 60/39.55
[58] Field of Search ............................. 60/39.05, 39.53, 60/39.55

[56] References Cited

U.S. PATENT DOCUMENTS

| | | | |
|---|---|---|---|
| 864,017 | 8/1907 | Miller | 60/39.55 |
| 2,168,313 | 8/1939 | Bichowsky | 60/39.55 |
| 2,523,656 | 9/1950 | Goddard | 60/39.55 |
| 2,636,345 | 4/1953 | Zoller | 60/39.55 |
| 3,359,723 | 12/1967 | Bohensky et al. | 60/39.05 |
| 3,369,361 | 2/1968 | Craig | 60/39.55 |
| 4,041,699 | 8/1977 | Schelp | 60/39.55 |
| 4,527,514 | 7/1985 | Niggemann | 60/39.55 |
| 5,055,030 | 10/1991 | Schirmer | 60/39.05 |

FOREIGN PATENT DOCUMENTS

| | | | |
|---|---|---|---|
| 316132A | 5/1989 | European Pat. Off. | 60/39.55 |
| 1476902 | 10/1969 | Germany | 60/39.55 |
| 271706 | 5/1927 | United Kingdom | 60/39.55 |
| 283290 | 1/1928 | United Kingdom | 60/39.55 |

OTHER PUBLICATIONS

1991 ASME Cogen–Turbo, vol. 6, "A Study on Modified Gas Turbine Systems with Steam Injection or Evaporative Regeneration", K. Annerwall and G. Svedberg, Sep. 1991.
NASA Technical Memorandum 89817, 1987, "Contingency Power for Small Tuboshaft Engines Using Water Injection into Turbine Cooling Air", Thomas Biesiadny, Gary Klann, David Clark and Brett Berger, Prepared for 23rd Joint Propulsion Conference, Jun. 1987.
"Aero–Derived Reheat Gas Turbines with Stem Injection into the Afterburner", G. Cerri and E. Sciubba, Rome, Italy, (Date Unknown).
"Steam Injected Gas Generators in Power Plants" G. Cerri and G. Arsuffi, Rome Italy, (Date Unknown).
"Steam–Injected Gas Turbine Integrated With a Self–Production Demineralized Water Thermal Plant", G. Cerri and G. Arsuffi, Transactions of the ASME, vol. 110, pp. 8–16, Jan. 1988.
"Development of Steam Injection for Ruston TB5000 and Tornado Engines", D. J. Ecob and D. G. Marriott, Presented at the Gas Turbine and Aeroengine Congress and Exposition, Jun. 4–8, 1989, Toronto, Ontario, Canada.
"A Novel Heat–Recovery Process for Improving the Thermal Efficiency of Gas Turbines in Electric Power General" Charles R. Higdon, Bert M. Louks and Scott Lynn, (Date Unknown).
"Steam Cooling of High–temperature Gas Turbines", I. I. Kirillov, L. V. Arsen'ev, Thermal Engineering 33(1), 1986.
"The Results of an Experimental Investigation into Lowering the Emission of Nitrogen Oxides by Spraying Steam or Water into the Combustion Zone", V. B. Krugov, N. S.

(List continued on next page.)

Primary Examiner—Richard A. Bertsch
Assistant Examiner—Howard R. Richman
Attorney, Agent, or Firm—Harness, Dickey & Pierce

[57] ABSTRACT

A gas turbine engine assembly including an improved apparatus for cooling the combustor to preclude thermal failure of the combustor and to preclude $NO_x$ formation. The system includes a liquid pump driven by the turbine shaft and supplying a cooling fluid to an annular chamber defined around the central combustion chamber of the combustor. The cooling fluid is thereby placed in heat exchange relation to the combustor to absorb heat from the combustion products within the combustion chamber and convert the fluid to a relatively higher energy condition, whereafter the fluid in its high energy condition is injected into the combustion chamber for mixture with the combustion products and delivery with the combustion products to the turbine inlet. The cooling liquid may totally fill the annular cooling chamber around the combustion chamber or may partially fill the cooling chamber, or the cooling fluid arriving at the cooling chamber may already be in a gaseous state so that the cooling chamber is totally filled with a vapor.

15 Claims, 4 Drawing Sheets

OTHER PUBLICATIONS

Shestakov, V. N. Shvedkov, V. YuFiveiskii, Thermal Engineering, 26(11), 1979.

"Steam–Injected Gas Turbines", E. D. Larson and R. H. Williams, Journal of Engineering for Gas Turbines and Power, Jan. 1987, vol. 109, pp. 55–63.

"Comparative Energy Analysis of Stig and Combined–Cycle Gas Turbines", G. Manfrida and A. Bosio, Firenze, Italy, (Date Unknown).

"Influence of Gas Turbine Combustor Design and Operating Parameters on Effectiveness of $NO_x$ Suppression by Injected Steam or Water", G. L. Touchton, Transactions of the ASME, vol. 107, pp. 706–713, Jul. 1985.

"Influence of Water Injection on the Formation of Nitrogen Oxides at the Outlet of the Combustion Chamber with Series Introduction of Air into the Combustion Zone", A. G. Tumanovskii, V. F. Tul'skii, Terhmal Engineering, 29 (6), 1982.

"Status of Steam–Injected Gas Turbines", John Tuzson, 1991 ASME Cogen–Turbo, IGTI–vol. 6, pp. 19–24.

"The Feasibility of Water Injection Into the Turbine Coolant to Permit Gas Turbine Contingency Power for Helicopter Application", G. J. VanFossen, Journal of Engineering for Power, Jul. 1983, vol. 105, pp. 635–642.

COMBUSTOR COOLING FOR GAS TURBINE ENGINES

BACKGROUND OF THE INVENTION

This invention relates to gas turbine engines and more particularly to improved methods and apparatus for cooling the combustor and combustion gases of a gas turbine engine.

It is important to provide cooling for the combustor and combustion gases of a gas turbine engine in order to maintain the combustor, turbine, and combustion gas conduits of the engine below the temperature at which thermal failure occurs and to also limit the formation of nitric oxide ($NO_x$). Various methods and apparatus have been utilized in the past to achieve combustor and combustion gas cooling including passage of cooling air over and through the combustor, the injection of steam into the combustor cooling air, the injection of a water spray into the combustor cooling air, and various combinations of these methodologies and apparatuses. Whereas these prior art methodologies are useful in lowering the temperature of the combustor and combustion gases, the cooling is achieved through losses in the overall engine system since the work required to deliver the primary coolant, air, is excessive, and the quantity of energy recoverable with the small steam and/or water injection rates permitted is negligible.

SUMMARY OF THE INVENTION

This invention is directed to the provision of an improved gas turbine engine assembly.

More specifically, this invention is directed to the provision of an improved combustor for a gas turbine engine assembly.

Yet more specifically, this invention is directed to the provision of an improved method and apparatus for cooling the combustor and combustion gases of a gas turbine engine assembly.

The invention discloses a method of cooling the combustor and combustion gases of a gas turbine engine assembly of the type including a turbine and a combustor arranged to receive a fuel/air mixture and generate products of combustion within the combustor for delivery to the turbine.

According to the invention, a fluid is delivered to the combustor by a pump and is placed in heat exchange relation with the combustion products within the combustor so that thermal energy is absorbed from the combustion products by the fluid, and the fluid is thereafter injected into the combustion products for delivery with the combustion products to the turbine. This methodology allows combustor cooling to be achieved with a minimum of energy loss in the total system, thereby maximizing the overall efficiency of the total system.

In one embodiment of the invention, liquid is delivered to the combustor where it is placed in heat exchange relation with the combustion products before being injected into the combustion gases as liquid.

In a further embodiment of the invention, liquid is delivered to the combustor where it is placed in heat exchange relation with the combustion products before being injected into the combustion gases as gas or vapor.

In a further embodiment of the invention, gas or vapor is delivered to the combustor where it is placed in heat exchange relation with the combustion products before being injected into the combustion gases as gas or vapor.

According to a further feature of the invention methodology, the combustion has a central combustor chamber for containing the combustion products and an annular cooling chamber in surrounding relation to the central combustion chamber and having apertures communicating with the central combustion chamber; the step of placing the fluid in heat exchange relation with the combustion gases comprises delivering the fluid to the annular cooling chamber in its low energy liquid phase; the conversion of the fluid to a higher level of energy occurs in the annular cooling chamber; and the step of injecting the fluid into the combustor comprises passing the fluid in its relatively high energy condition through the apertures and into the central combustion chamber.

According to a further feature of the invention, the turbine engine assembly includes a shaft driven by the turbine and a pump driven by the shaft and the fluid is delivered to the combustor by the pump.

The invention also provides an improved combustor for generating combustion products for delivery to a gas turbine. The improved combustor includes a central combustion chamber defining a central axis; a burner positioned to deliver products of combustion to one end of the chamber; a discharge at the other end of the chamber for delivering the combustion products to the turbine; an annular cooling chamber in surrounding relation to the central combustion chamber; an entry opening in the cooling chamber for receipt of a cooling liquid; and a plurality of apertures communicating the cooling chamber with the central combustion chamber. This combustor construction allows the cooling fluid to be placed in heat exchange relation to the combustor so that thermal energy is absorbed from the combustion products within the combustor before the fluid is injected into the combustor through the apertures interconnecting the cooling chamber and central combustion chamber.

According to a further feature of the invention, the combustor is positioned with its central axis generally vertical; the burner is proximate the lower end of the combustion chamber; the discharge is proximate the upper end of the combustion chamber; and the entry opening in the cooling chamber is proximate the lower end of the combustion chamber. This specific arrangement and orientation of the combustor facilitates the placement of the cooling fluid in heat exchange relation to the combustion chamber.

The invention also provides an improved gas turbine engine assembly. The improved gas turbine engine assembly includes a turbine driving a shaft; a combustor operative to generate products of combustion for delivery to the turbine; a source of a cooling liquid; and a pump driven by the turbine shaft, having an inlet connected to the liquid source, and having an outlet connected to the combustor. This arrangement allows a cooling liquid to be delivered to the combustor by a pump driven by the turbine, to improve the overall efficiency of the assembly.

According to a further feature of the invention, the combustor includes a central combustion chamber and an annular cooling chamber in surrounding relation to the central combustion chamber and connected to the combustion chamber by a plurality of apertures; the pump outlet is connected to the cooling chamber of the combustor by conduit means; and the assembly further includes a heat exchanger in the conduit means, the heat exchanger receiving the discharge of the turbine. This arrangement allows the energy content of the cooling fluid to be increased by utilizing the waste products of the turbine.

According to a further feature of the invention, the assembly further includes means for delivering further energy to the fluid flowing through the conduit means. In the disclosed embodiment of the invention, the energy delivery means comprises a boiler arranged in the conduit interconnecting the pump to the cooling chamber of the combustor.

DETAILED DESCRIPTION OF THE PREFERRED EMBODIMENTS

Figure 1:
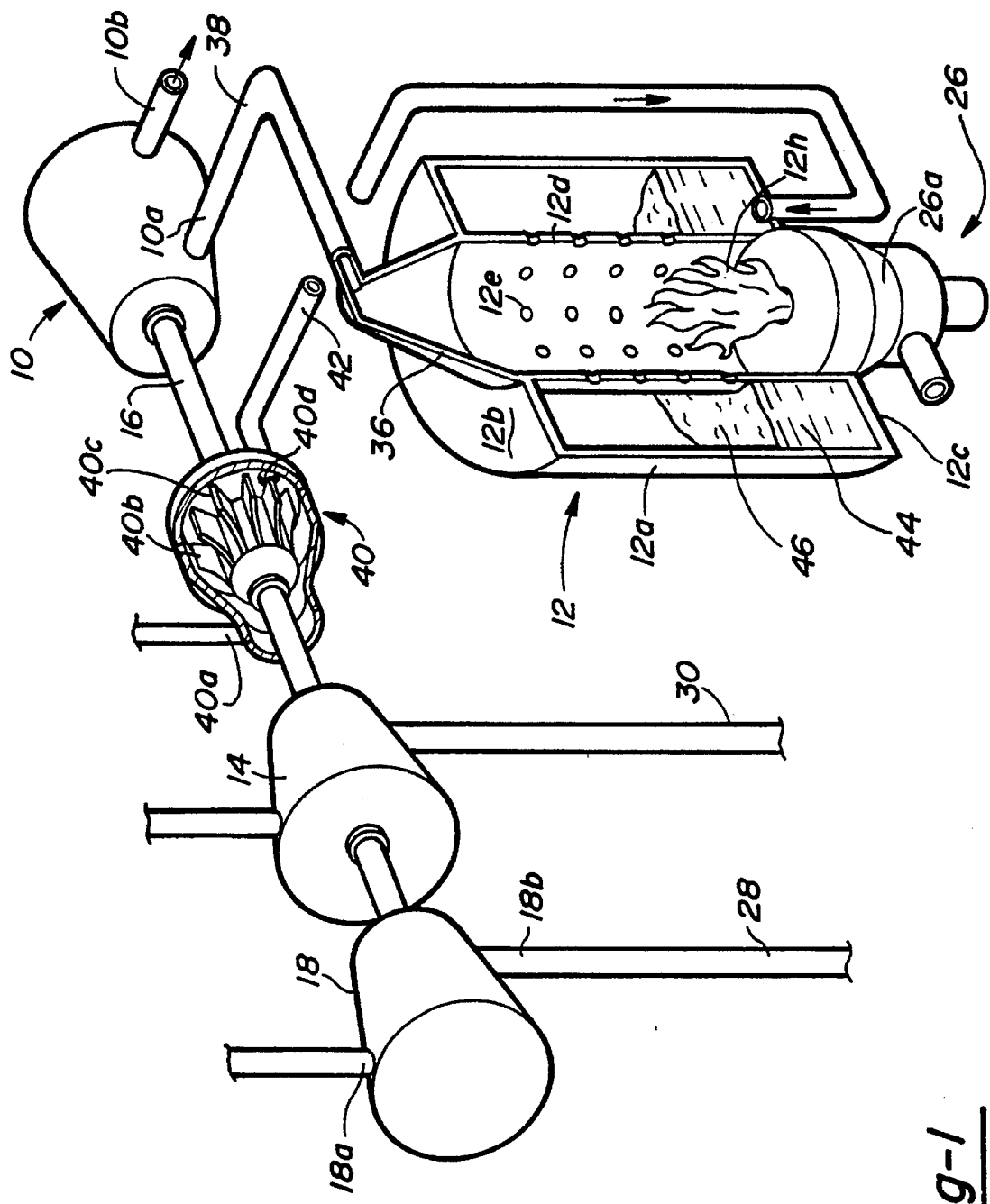
FIG. 1 is a perspective, partially cross sectional view of a gas turbine engine assembly according to the invention.

Each of the invention embodiments is of the type including a turbine 10 of known form having an inlet 10a and an outlet or discharge 10b; a combustor 12 arranged to deliver products of combustion to inlet 10a of the turbine and thereby drive the turbine; a compressor 14 driven by shaft 16 of the turbine and including an inlet 14a connected to a source of fuel and an outlet 14b for delivering the fuel in pressurized form to the combustor; and a compressor 18 driven by shaft 16 and having an inlet 18a connected to a source of air and an outlet 18b for delivering pressurized air to the combustor for mixture with the fuel from compressor 14 to provide a fuel/air mixture for combustion in the combustor to produce combustion products for delivery to the turbine to drive the turbine.

The invention provides an improved combustor 12 as well as an improved means of cooling the combustor.

The invention combustor has a generally cylindrical configuration and defines a central vertical axis 20. Combustor 12 includes cylindrical outer wall 12a; a circular upper wall 12b; a circular lower wall 12c; an inner cylindrical wall 12d defining a central cylindrical combustion chamber 22 and concentrically coacting with outer wall 12a to define an annular cooling chamber 24; a plurality of apertures 12e in inner wall 12d providing communication between annular cooling chamber 24 and central combustion chamber 22; a central discharge aperture 12f in upper wall 12b; an opening 12g in lower wall 12c within annular cooling chamber 24; and a burner 26 positioned centrally in lower wall 12c. Apertures 12e are arranged in vertically spaced rows with each row including a plurality of circumferentially and equally spaced apertures. The rows of apertures begin in the midregion of inner wall 12d and extend upwardly to a topmost row proximate discharge aperture 12f, that is, there are no apertures in the lower region 12h of inner wall 12d.

Burner 26 provides a pre-combustor for combustor 12 in the sense that the actual combustion process takes place within burner 26 utilizing air delivered to the burner from compressor 18 via a conduit 28, and fuel delivered to the burner from compressor 14 via conduit 30. The fuel and air are mixed within the burner and combusted within the burner to define flame front 32 within central combustion chamber 22. Burner 26 may take various forms and, for example, may include a housing 26a and an electrode 26b supplied by electrical conductors 34 and functioning in a known manner to combust the fuel and air mixture within housing 26a for delivery into combustion chamber 22 to form flame front 32. Burner 26 may, for example, comprise a gas, coal, or fuel oil burner available from Maxon Corporation of Muncie, Ind. as Part No. WR-3. It will be understood that whereas the initial combustion of the fuel/air mixture occurs within burner 26, post combustion also occurs within combustion chamber 22. Discharge opening 12f of the combustor is connected via hood 36 and conduit 38 to inlet 10a of turbine 10 so that the products of combustion generated within combustion chamber 22 are delivered to the turbine inlet to drive the turbine.

The cooling of the combustor is accomplished by cooling chamber 24 in coaction with pump 40 and conduit 42. Pump 40 is a liquid pump and may take various forms, including a gear pump, a lobe pump, a rotary pump or a centrifugal pump. A centrifugal pump is illustrated and includes an inlet 40a connected to a source (not illustrated) of liquid such as water and an impeller 40b mounted on shaft 16 and including a circumferentially spaced series of curved vanes 40c. It will be understood that when the impeller is driven by shaft 16, liquid is drawn in through inlet 40a from the liquid source, passes between the vanes of the impeller, and is thereafter thrown outward by centrifugal force for passage through pump outlet 40b and into conduit 42.

Conduit 42 extends from pump outlet 40d to the inlet opening 12g in the cooling chamber of the combustor so that cooling liquid from pump 40 is conveyed by conduit 42 to annular cooling chamber 24.

During steady state operation of the gas turbine engine assembly, fuel and air is delivered to the combustor via conduits 30 and 28 for combustion in the combustor to form flame front 32 within central combustion chamber 22 of the combustor, the combustion products from the combustion chamber are delivered via conduit 38 to the inlet of the turbine to drive the turbine, and the turbine shaft drives pump 40 and compressors 14 and 18 to provide continuous delivery of fuel and air to the combustor and to further provide delivery of a cooling fluid to annular cooling chamber 24 of the combustor via conduit 42.

Figure 2:
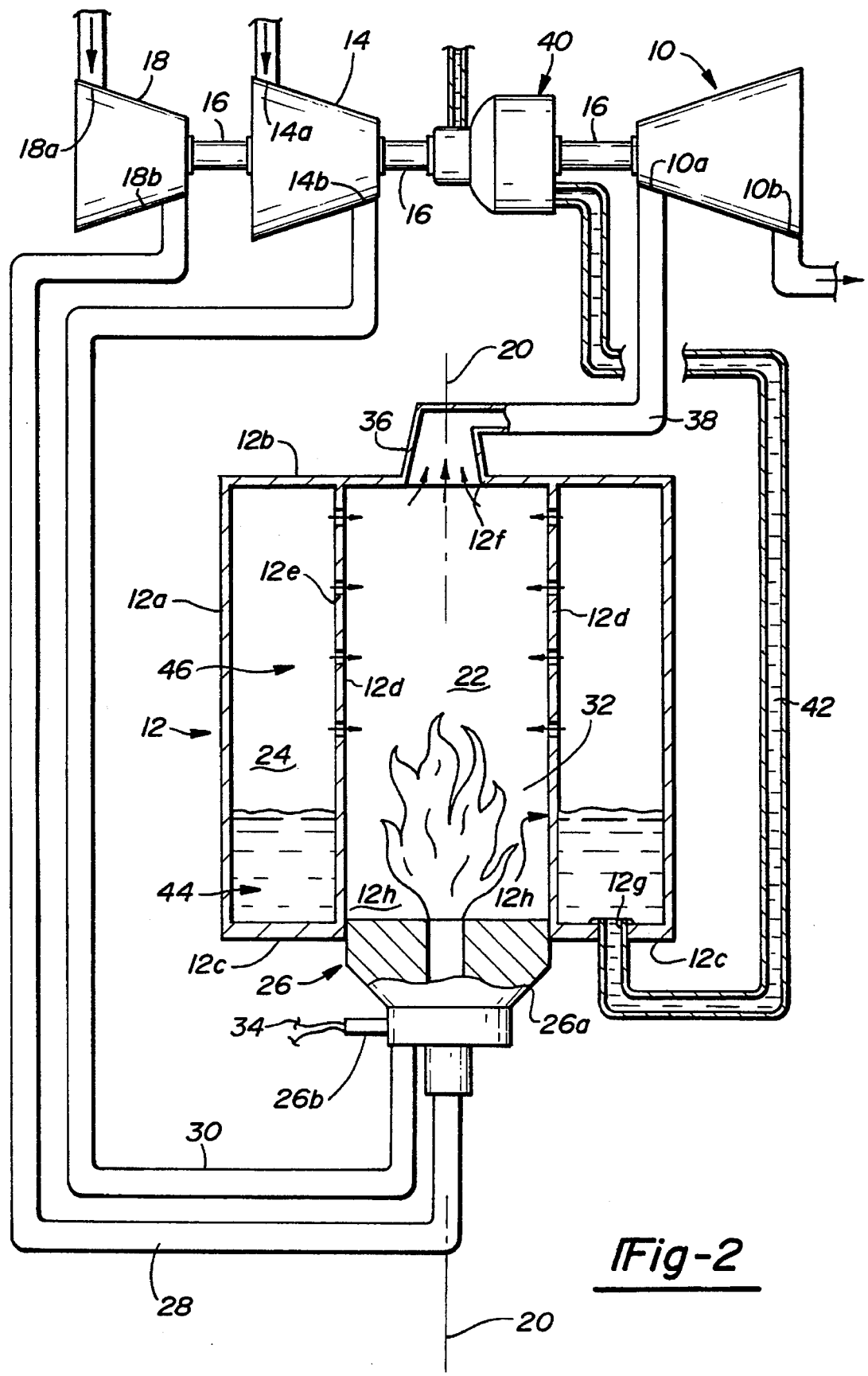
FIG. 2 is a somewhat schematic view of the gas turbine engine assembly of FIG. 1.

The behavior of the cooling fluid in annular cooling chamber 24 will vary depending upon the pressure and temperature at which fluid is delivered to the cooling chamber. For example, and as shown in FIGS. 1 and 2, water may be delivered to cooling chamber 24 in a steady state manner at 30 bars and 300° Kelvin, in which case, assuming combustion chamber 22 is operating at 25 bars and 2,300° Kelvin at flame front 32 with an arbitrary combustion rate of 150 kilowatts, the gas turbine engine assembly can be sized such that water can be maintained in the lower end of the annular combustion chamber, below lowermost aperture 12e, to form annular water bath 44. Water bath 44 absorbs energy from the combustion products within the combustion chamber through inner wall 12d with the result that the water is converted to a vapor or steam phase 46 which forms in cooling chamber 24 above bath 44 and thereafter passes through apertures 12e and into combustion chamber 22 where it mixes with the combustion products within the combustion chamber and passes with the combustion products through hood 36 and conduit 38 to the inlet of the turbine to drive the turbine.

The energy absorbed from the flame front by the annular body of water 44 (representing the energy required to change the water from a liquid to a gas phase) together with the cooling effect of the vapor as it passes through apertures 12e and joins the combustion products within the combustion chamber, has the effect of reducing the temperature of the combustion products leaving the combustor through aperture 12f to approximately 1140° Kelvin. This temperature is low enough to ensure that the combustor does not suffer thermal failure and is further low enough to ensure that there is no significant $NO_x$ formation within the combustor.

Figure 3:
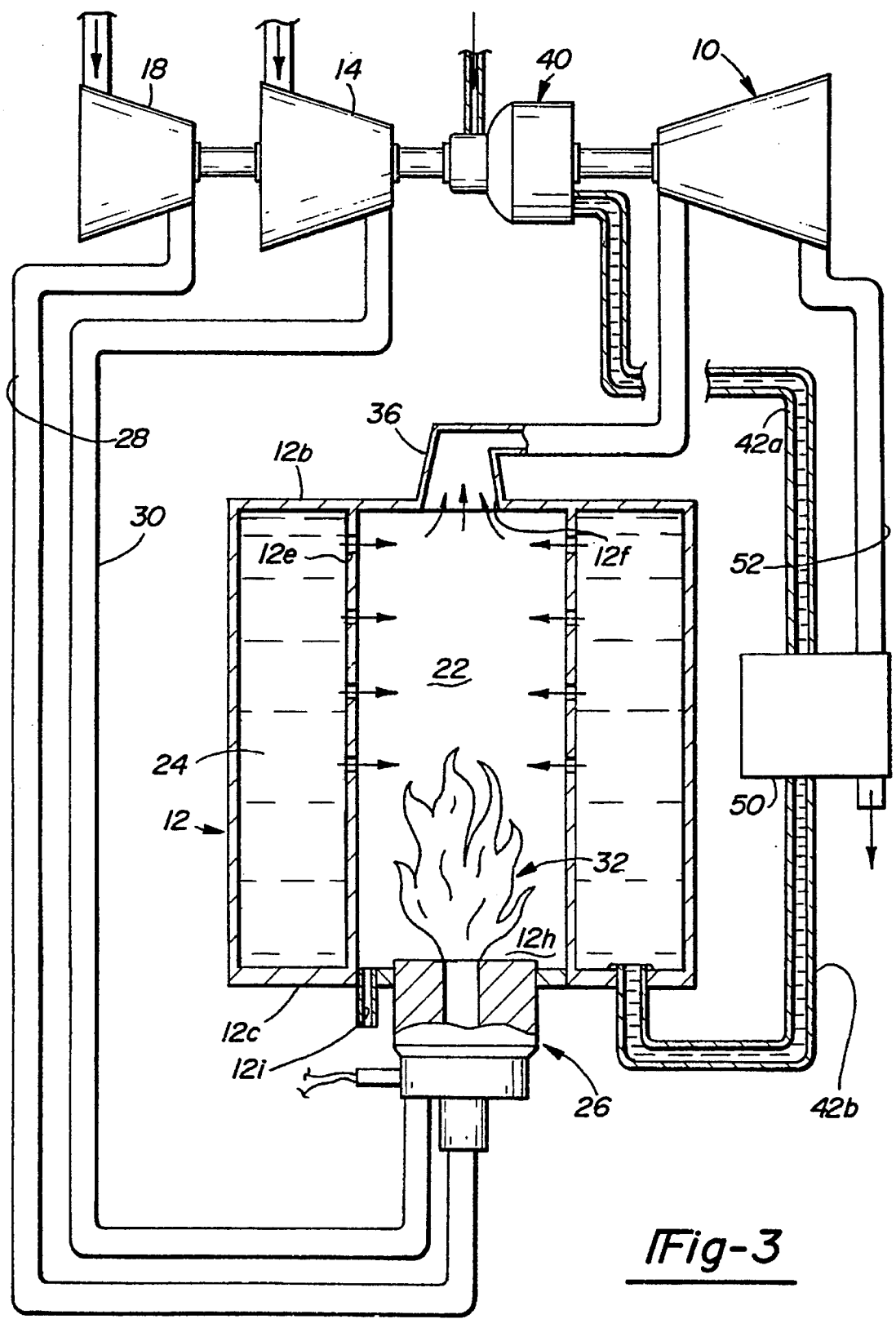
FIG. 3 is a somewhat schematic view of a modified form of the gas turbine engine assembly according to the invention.

The modified gas turbine engine assembly shown in FIG. 3 is generally similar to the assembly shown in FIGS. 1 and 2 with the exception that the assembly in FIG. 3 further includes a heat exchanger 50 positioned in conduit 42 and arranged to receive the discharge from outlet 10b of the turbine through conduit 52 and place the discharge products from the gas turbine in heat exchange relation to the cooling fluid flowing through conduit 42, whereby to add energy to the fluid so that the fluid arriving at inlet 12g of the combustor has a higher energy content than the fluid leaving pump 40.

As with the assembly of FIGS. 1 and 2, the nature and behavior of the fluid within cooling chamber 24 may be selectively varied by selective variation of the temperature and pressure under which the cooling fluid is delivered to the cooling chamber through conduit 42. For example, water may be delivered to heat exchanger 50 in a steady state manner at 100 bars and 300° Kelvin, and thermal energy may ideally be added to the water so that it enters conduit 42b, for delivery to cooling chamber 24 at 100 bars and 584° Kelvin. When the water enters inlet 12g at 100 bars and 584° Kelvin, cooling chamber 24 is totally filled with water, and again assuming combustion chamber 22 is operating at 25 bars and 2300° Kelvin at flame front 32 with an arbitrary combustion rate of 150 kilowatts, the gas turbine engine assembly can be sized such that thermal energy is absorbed through wall 12d from flame front 32 so as to cool the flame front and raise the temperature of the water. In this embodiment, with the given parameters, water passes through apertures 12e in a still liquid form and undergoes a phase change immediately upon entering combustion chamber 22 whereby to extract further energy from the flame front by virtue of the energy required to change the water to a gas or vapor, whereafter the gas or vapor passes out of the combustion chamber through discharge opening 12f for delivery with the combustion products to the inlet of the gas turbine. As with the assembly shown in FIGS. 1 and 2, the combined effect of the energy absorbed by the water residing in annular cooling chamber 24, together with the energy required to accomplish the phase change of the water as it passes through openings 12e and encounters the flame front, has the effect of lowering the combustor temperature to a point (for example, 1140° Kelvin at discharge aperture 12f) where thermal failure of the combustor is prevented and no significant $NO_x$ forms.

It should be understood that, in the embodiment of FIG. 3, the cooling flow rate can be increased such that coolant can pass through apertures 12e in liquid form whereafter some of the liquid can pass to a vapor and some of the liquid can flow downwardly by gravity to absorb energy and remove fuel contaminants whereafter the liquid can be removed through a drain port 12i. For example, the liquid flowing outwardly through drain port 12i can be at 490° Kelvin and 25 bars. Supplying excess liquid to the combustor and allowing the excess liquid to flow downwardly in the combustor for discharge through drainage port 12i has a washing down effect and, specifically, and depending upon the fuel employed, removes fuel bound metals such as lead, nickel and vanadium, minerals such as calcium and sulphur, and combustion products such as coke, ash and soot.

Figure 4:
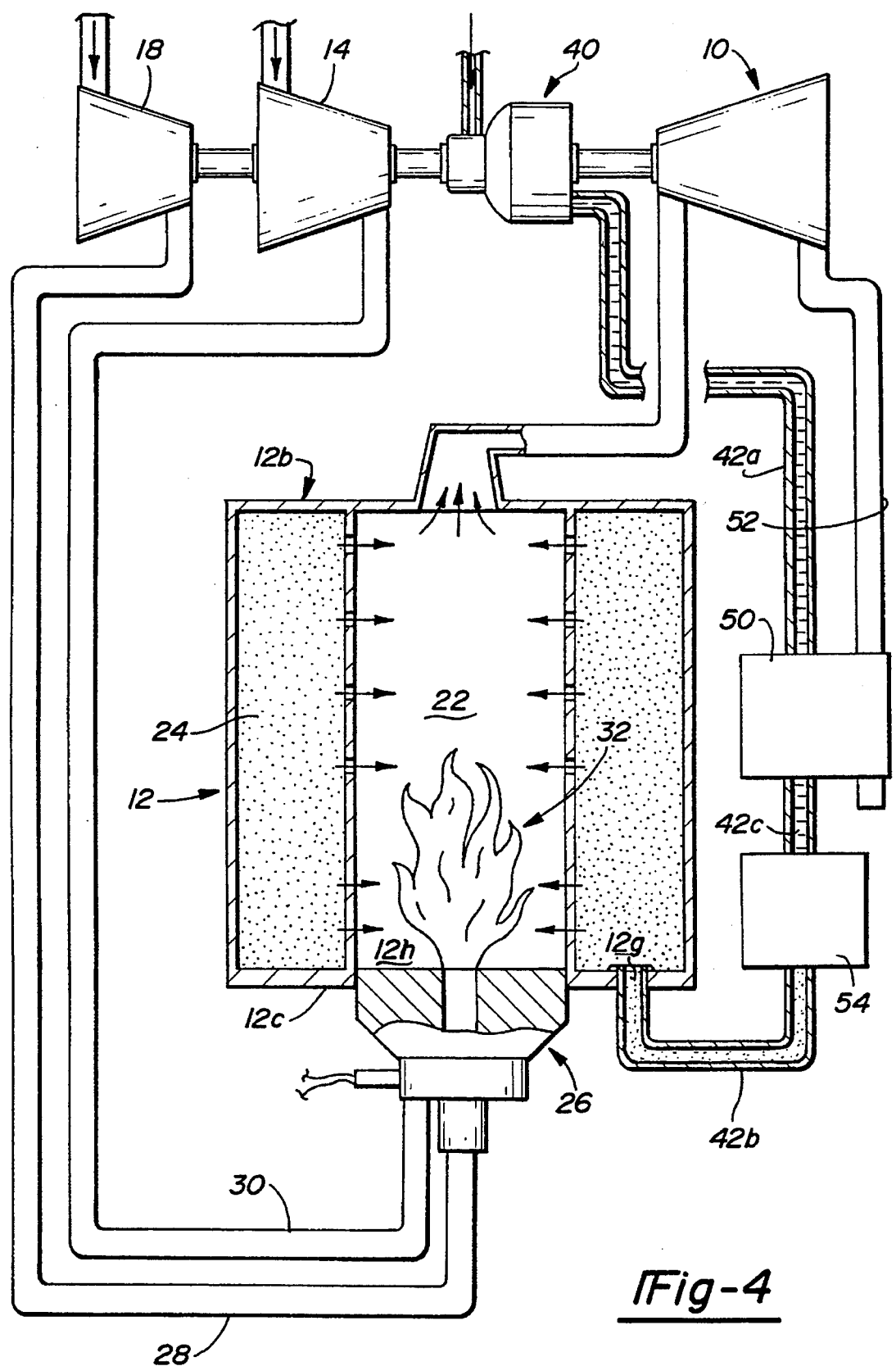
FIG. 4 is a somewhat schematic view of a still further modified form of the gas turbine engine assembly according to the invention.

The embodiment of the gas turbine engine assembly seen in FIG. 4 is similar to the embodiment seen in FIG. 3 with the exception that apparatus 54 is interposed in the conduit 42 in a manner which allows apparatus 54 to receive the cooling fluid output of heat exchanger 50 through conduit 42c before the cooling fluid is delivered to cooling chamber 24 through conduit 42b. Apparatus 54 may, for example, comprise a boiler fired by a separate source of energy, such as gas, so that apparatus 54 serves to add further energy to the fluid flowing through conduit 42.

As with the embodiment of FIGS. 1 and 2 and the embodiment of FIG. 3, the nature and behavior of the fluid in cooling chamber 24 may be selectively modified by selectively varying the various parameters of the system. For example, the pump parameters may be chosen such that water leaves the pump at 300 bars and 300° Kelvin; heat exchanger 50 parameters may be chosen such that water leaving the heat exchanger is at 300 bars and 584° Kelvin; and the boiler parameters may be chosen such that superheated steam or water vapor leaves boiler 54 and thereafter enters cooling chamber 24 through inlet 12g at 673° Kelvin and 300 bars. With these parameters, cooling chamber 24 is totally filled with water vapor or gas, and as the vapor or gas resides in the cooling chamber 24, it absorbs energy from the flame front through inner wall 12d whereby to raise the temperature of the vapor or gas in the cooling chamber, whereafter the gas or superheated vapor passes through apertures 12e to join the flame front for passage out of the discharge aperture 12f and passage with the combustion products to the inlet of the turbine.

As with the embodiment of FIGS. 1 and 2, and the embodiment of FIG. 3, the combined action of the energy absorbed by the vapor residing in cooling chamber 24 and the cooling effect of the vapor as it passes through apertures 12e to join the flame front, has the effect of reducing the combustor temperature to a temperature below the thermal failure temperature of the combustor and below the temperature at which any significant $NO_x$ formation takes place. As with the embodiment of FIGS. 1 and 2, and the embodiment of FIG. 3, the temperature of the combustion products leaving the combustion chamber through apertures 12f may be controlled to approximately 1140° Kelvin, assuming combustion chamber 22 is operating at 25 bars and 2300° Kelvin at flame front 32, with an arbitrary combustion rate of 150 kilowatts.

In each of the invention embodiments, it will be seen that the cooling of the combustor is accomplished without the use of cooling air. It will further be seen that, in each case, energy is absorbed from the flame front in a two-stage process with the first stage comprising the absorption of energy by the cooling fluid in chamber 24 through inner wall 12d and the second stage comprising the further cooling of the flame front as the fluid in cooling chamber 24 passes through apertures 12e to join the flame front.

The invention will be seen to provide a simple and efficient means of maintaining the combustor below the temperature at which thermal failure and $NO_x$ formation occurs without substantially interfering with flame ignition or maintenance, and without elevating the carbon monoxide, level unburned hydrocarbon, level or fuel consumption of the engine. Specifically, the invention methodology, requiring only a relatively low energy consumption pump to provide the cooling needs of the combustor as opposed to the relatively high energy air compressors of the prior art, has the effect of increasing the net turbine work output since the energy required to produce the required cooling effect is significantly reduced as compared to systems in which the cooling is achieved utilizing air or a combination of air, water injection and/or steam injection.

Whereas preferred embodiments of the invention have been illustrated and described in detail, it will be apparent that various changes may be made in the disclosed embodiments without departing from the scope or spirit of the invention. For example, although the invention has been described with reference to a liquid or a gas utilized as the cooling substance, the cooling substance may also, in certain applications, comprise a suitable alkali metal or Newtonian fluid, and the term substance as used in the claims is intended to include a liquid, gas, aklali metal, or Newtonian fluid.

What is claimed is:

1. A method of cooling a combustor and combustion gases of a gas turbine engine assembly of the type including a turbine, said combustor defining a combustion chamber and including a burner disposed adjacent to one end of said combustion chamber, said burner arranged to receive a fuel/air mixture and generate products of combustion within said burner for delivery to said turbine through said combustion chamber, the method comprising:

delivering a substance to said one end of said combustion chamber in a low energy liquid phase;

placing said substance in heat exchange relation to said combustion chamber by forming an annular bath around said combustion chamber to absorb thermal energy from said combustion products within said combustion chamber and thereby converting said substance to a higher energy level; and injecting said higher energy level substance into the opposite said combustion chamber proximate the opposite end of said combustion chamber for mixture with said combustion products and delivery in a gaseous phase with said combustion products to said turbine.

2. A method according to claim 1 wherein:

said combustor has an annular cooling chamber in surrounding relation to said combustion chamber and having apertures communicating with said combustion chamber;

the step of placing said substance in heat exchange relation with said combustion chamber comprises delivering said substance to said annular cooling chamber in its low energy liquid phase;

the conversion of said substance to its higher energy level occurs in said annular cooling chamber; and the step of injecting said substance into said combustion chamber comprises passing said substance in its higher energy level through said apertures and into said combustion chamber.

3. A method according to claim 1 wherein;

said low energy liquid phase comprises a low temperature liquid phase; and said higher energy level comprises a higher temperature liquid phase.

4. A method according to claim 1 wherein:

said higher energy level comprises a gas phase.

5. A method of cooling a combustor and combustion gases of a gas turbine engine assembly of the type including a turbine with an inlet and with a discharge of combustion products, said combustor defining a combustion chamber and including a burner disposed adjacent to one end of said combustion chamber, said burner arranged to receive a fuel/air mixture and generate products of combustion within said burner for delivery to said turbine through said combustion chamber, the method comprising:

providing a substance in a low energy liquid phase by a pump driven by said gas turbine;

placing said substance in heat exchange relation to said discharge of said turbine to convert said substance to a first level of higher energy in liquid phase;

delivering said substance to said one end of said combustion chamber at its first level of higher energy in liquid phase;

placing said substance in heat exchange relation to said combustion chamber to absorb energy from said combustion products within said combustion chamber and converting said substance to a second level of higher energy; and injecting said substance in its second level of higher energy into said combustion chamber proximate the opposite end of said combustion chamber for mixture with said combustion products and delivery with said combustion products to said turbine inlet;

wherein said substance converts to a gaseous phase before delivery to said turbine.

6. A method according to claim 5 wherein:

said combustor has an annular cooling chamber in surrounding relation to said combustion chamber and having apertures communicating with said combustion chamber;

said step of placing said substance in heat exchange relation with said combustion chamber comprises delivering said substance to said annular cooling chamber in its first level of higher energy in liquid phase;

said conversion of said substance to its second level of higher energy occurs in said annular cooling chamber; and said step of injecting said substance into said combustion chamber comprises passing the substance in its second level of higher energy through said apertures and into said combustion chamber.

7. A method according to claim 5 wherein:

said low energy liquid phase is a low temperature liquid phase;

said first level of higher energy is a first level of higher temperature liquid phase; and said second level of higher energy is a second level of higher temperature above said first level of higher temperature in liquid phase.

8. A method according to claim 5 wherein:

said first level of higher energy is a low temperature liquid phase; and said second level of higher energy is a higher temperature gas phase.

9. A method according to claim 7 and further comprising:

removing combustion contaminants by injecting said substance into said combustion chamber in its second level of higher energy liquid phase in a quantity sufficient to allow some of said liquid to wash down said combustor and combustion gases.

10. A combustor for generating combustion products for delivery to a gas turbine, said combustor comprising:

a central combustion chamber defining a central axis;

a burner disposed adjacent to one end of said central combustion chamber to deliver products of combustion to said one end of said central combustion chamber;

a discharge at the opposite end of said central combustion chamber for delivering combustion products to said turbine;

an annular cooling chamber in surrounding relation to said central combustion chamber;

an entry opening in said annular cooling chamber for receipt of a cooling fluid, said cooling fluid forming a bath within said annular cooling chamber to absorb thermal energy from said combustion products within said central combustion chamber; and a plurality of apertures providing communication between said annular cooling chamber and said central combustion chamber proximate said opposite end of said central combustion chamber.

11. A combustor according to claim 10 wherein:

said entry opening in said annular cooling chamber is adjacent to said one end of said central combustion chamber.

12. A combustor according to claim 11 wherein: said apertures are provided in an annular region extending from a midregion of said central combustion chamber to said opposite end of said central combustion chamber.

13. A gas turbine assembly comprising:

a turbine having an inlet for combustion products and a combustion product discharge, said turbine driving a turbine shaft;

a combustor operative to generate products of combustion for delivery to said turbine inlet, said combustor comprising:

a combustion chamber;

a burner disposed adjacent to one end of said combustion chamber to deliver products of combustion to said one end of said combustion chamber;

a discharge at the opposite end of said combustion chamber for delivering combustion products to said turbine inlet;

an annular cooling chamber in surrounding relation to said combustion chamber;

an entry opening in said annular cooling chamber for receipt of a cooling fluid, said cooling fluid forming a bath within said annular cooling chamber to absorb thermal energy from said combustion products within said combustion chamber;

a plurality of apertures providing communication between said annular cooling chamber and said combustion chamber proximate said opposite end of said combustion chamber;

a source of said cooling fluid; and a pump driven by said turbine shaft, having an inlet connected to said source of cooling fluid and having an outlet connected to said combustor for delivering said cooling fluid to said combustor in a liquid phase.

14. A gas turbine engine according to claim 13 wherein:

said pump outlet is connected to said annular cooling chamber by conduit means; and said gas turbine assembly further includes a heat exchanger for delivering thermal energy to cooling liquid flowing through said conduit means.

15. A gas turbine engine assembly according to claim 14 wherein:

said heat exchanger for delivering thermal energy comprises a boiler.

* * * * *